(12) United States Patent
Mayr et al.

(10) Patent No.: US 7,032,421 B2
(45) Date of Patent: Apr. 25, 2006

(54) KNURLING TOOL

(75) Inventors: Werner Mayr, Hall (AT); Hannes Erler, Volders (AT)

(73) Assignee: Swarovski-Optik KG, Absam (AT)

( * ) Notice: Subject to any disclaimer, the term of this patent is extended or adjusted under 35 U.S.C. 154(b) by 61 days.

(21) Appl. No.: 10/770,564

(22) Filed: Feb. 4, 2004

(65) Prior Publication Data

US 2004/0154373 A1    Aug. 12, 2004

(30) Foreign Application Priority Data

Feb. 5, 2003    (EP) ................... 03002450

(51) Int. Cl.
*B21D 15/00* (2006.01)

(52) U.S. Cl. .............. 72/108; 72/481.6; 72/481.7; 72/703

(58) Field of Classification Search ............ 72/103, 72/104, 108, 446, 447, 478, 481.3, 481.6, 72/481.7, 703; 408/147, 153, 181, 185; 407/76, 407/88

See application file for complete search history.

(56) References Cited

U.S. PATENT DOCUMENTS

| | | | | |
|---|---|---|---|---|
| 960,769 A | * | 6/1910 | Armstrong | 72/199 |
| 1,044,006 A | * | 11/1912 | Boche | 72/199 |
| 2,294,685 A | * | 9/1942 | Nelson | 72/104 |
| 2,579,611 A | * | 12/1951 | Poorman | 72/108 |
| 2,771,807 A | * | 11/1956 | Trinkle | 82/158 |
| 2,796,779 A | * | 6/1957 | Miller | 72/108 |
| 3,055,240 A | * | 9/1962 | Patzman et al. | 72/104 |
| 3,641,850 A | * | 2/1972 | Peterson | 82/158 |
| 3,704,958 A | * | 12/1972 | Gulibon et al. | 408/153 |
| 3,972,212 A | * | 8/1976 | Brinkman | 72/102 |
| 4,759,244 A | * | 7/1988 | Engibarov | 82/154 |
| 5,046,226 A | | 9/1991 | Che | |
| 5,992,199 A | | 11/1999 | Giannetti | |

FOREIGN PATENT DOCUMENTS

DE    1045762    12/1958

* cited by examiner

*Primary Examiner*—Ed Tolan
(74) *Attorney, Agent, or Firm*—Wenderoth, Lind & Ponack, L.L.P.

(57) ABSTRACT

A knurling tool is provided having a tool head which carries at least one knurling wheel and which is mounted adjustably on a shaft, wherein the tool head is mounted on the shaft linearly displaceably transversely with respect to the axis of the shaft, characterized in that there is provided a fixing device for securing the relative position of the tool head and the shaft, the fixing device being arranged between the tool head and the shaft.

10 Claims, 3 Drawing Sheets

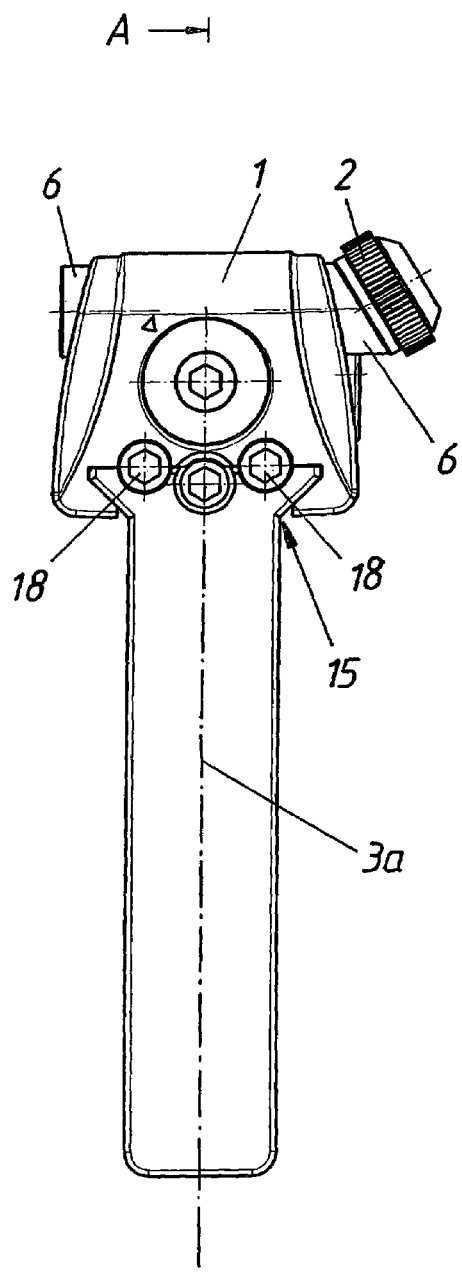
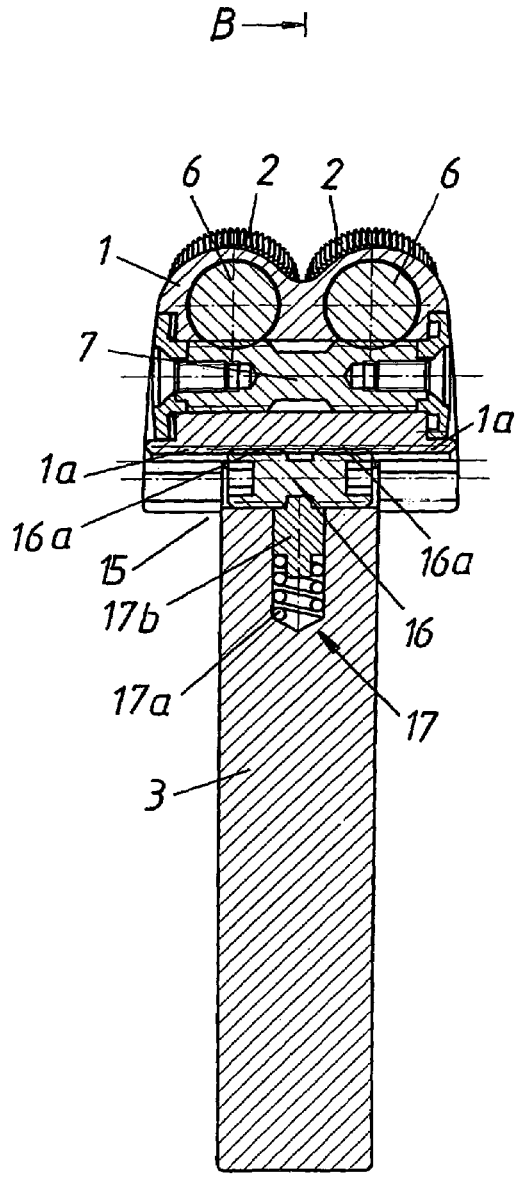

KNURLING TOOL

BACKGROUND OF THE INVENTION

The present invention concerns a knurling tool comprising a tool head which carries at least one knurling wheel and which is mounted adjustably on a shaft, wherein the tool head is mounted on the shaft linearly displaceably transversely with respect to the axis of the shaft.

Knurling tools comprising a tool head which is mounted adjustably on a shaft are already known. One example is illustrated in German patent DE 970 092. In the state of the art the tool head of the knurling tool is mounted on the shaft rotatably about an axis so that the tool head can be oriented relative to the workpiece to be worked upon, with the shaft being clamped, for example, to the support of a turning lathe or a CNC-machine.

A knurling tool in which the tool head is displaceable on the shaft linearly transversely with respect to the axis of the shaft is disclosed, for example, in U.S. Pat. No. 5,992,199. The tool head is compressed by a clamping screw in order to fix the tool head in position on the shaft.

It has been found that this adjustment option for the tool head with respect to the shaft is in practice not sufficient to permit adaptation to all types of machines. Rather, it was necessary to manufacture knurling tools of the specified kind, with various shafts, in order to cover the clamping situation in relation to the most common types of machines. In addition, when high loadings are involved, the requirements for adequate stability in respect of shape of the shaft and the tool head are only partially met.

SUMMARY OF THE INVENTION

The object of the present invention is to provide a knurling tool of a robust structure, which can be adjusted in such a way that it can be used in relation to the most widely varying types of machines (for example, in the case of machines which rotate clockwise and counter-clockwise) and which, in addition, provides improved stability in respect of shape.

In accordance with the present invention, there is provided a fixing device for securing the relative position of the tool head and the shaft, the fixing device being arranged between the tool head and the shaft.

The tool head can be optimally fixed in its relative position with respect to the shaft without the tool head or the shaft having to be compressed by a clamping device. Therefore, without the provision of a clamping gap, the two structural components can be of a more robust construction, thereby affording improved stability in respect of shape of the knurling tool.

Particularly precise guidance is possible by means of a dovetail guide means.

In order to be able to adjust the relative position between the tool head and the shaft, there is provided an adjusting device, for example, with an adjusting screw. The set position can then be preferably secured by a fixing device, for example, by means of clamping eccentrics.

Further advantages and details of the invention are described more precisely with reference to the specific description hereinafter.

BRIEF DESCRIPTION OF THE DRAWINGS

FIG. 1 shows a side view of an embodiment of a knurling (milling) tool according to the present invention, FIG. 2 shows a view in section taken along line A—A in FIG. 1.

DETAILED DESCRIPTION OF THE INVENTION

Figure 3:
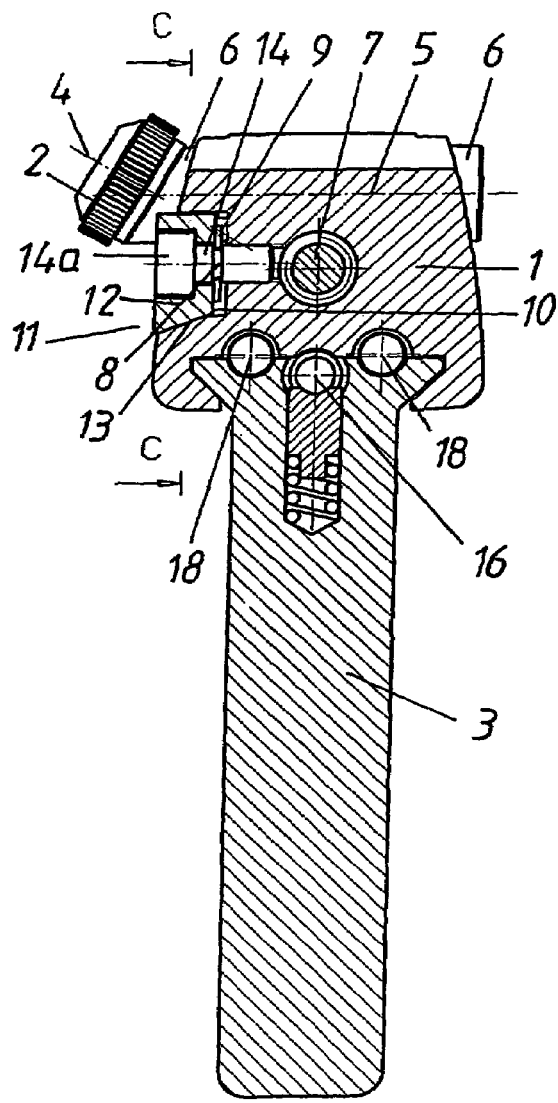
FIG. 3 shows a view in section taken along line B—B in FIG. 2.
Figure 4:
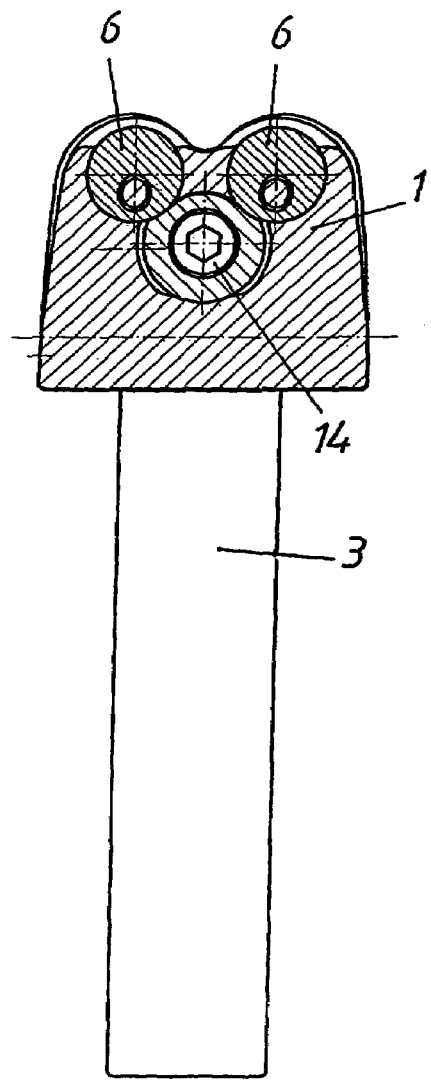
FIG. 4 shows a view in section taken along line C—C in FIG. 3.
Figure 5:
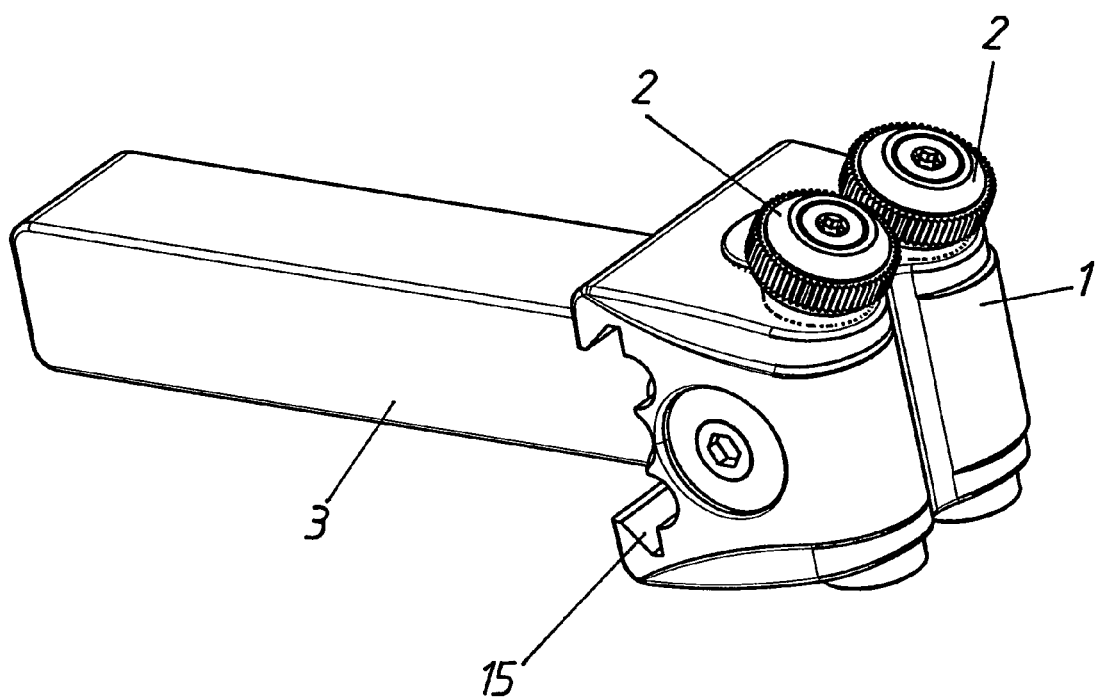
FIG. 5 shows a perspective view.

The knurling milling tool shown in FIGS. 1 through 5 has a tool head 1 carrying two knurling wheels 2. As will be described in greater detail hereinafter, the tool head 1 is mounted adjustably on the shaft 3.

Each of the two knurling wheels 2 is mounted freely rotatably about an axis 4 on a pivot pin 6 which in turn is mounted rotatably in the tool head 1. The two pivot pins 6 can be adjusted by way of a screwthreaded spindle 7 jointly but in opposite relationship in the tool head 1, whereby the relative spacing of the two knurling wheels 2 is adjustable. Synchronous adjustment is known per se, for example, from DE 970 092.

An arresting device 11 is provided in order to secure the rotary position, once set, of the pivot pins 6 about the axis 5 in the tool head 1. The arresting device 11 has a clamping member 12, which on the one hand is supported against an inclined surface 13 of the tool head 1, and which on the other hand bears against the peripheral surface of the pivot pins 6. The clamping member 12 is moved or clamped by way of a screw 14 which can be screwed into the tool head 1. When the screw 14 (with screw head 14a) is screwed in, in the horizontal direction as shown in FIGS. 1 through 4, the clamping member 12 moves upwardly due to the inclined surface 13 and in a simple manner jointly and synchronously clamps the two pivot pins 6 firmly in the position previously set by way of the spindle screw 7.

When the screw 14 is unscrewed, the disk 9 which is mounted in the groove 8 in the screw 14 and which bears against the rear side 10 of the clamping member 12 entrains the clamping member 12 outwardly and thus actively releases the clamping action.

To guide the tool head 1 with respect to the shaft 3, the arrangement has a linear guide means 15 which extends transversely with respect to the axis 3a of the shaft and which, in the illustrated embodiment by way of example, is in the form of a dovetail guide means.

Provided as an adjusting device for setting the relative position of the tool head 1 and the shaft 3 is an adjusting screw 16 which extends in the horizontal direction in FIGS. 1 through 4. The adjusting screw 16 is mounted in the shaft 3 rotatably but axially immovably and engages with its screwthread flights 16a into corresponding screwthread flights 1a on the tool head 1. This permits precise adjustment of the tool head 1 with respect to the shaft 3. In order to permit play-free movement of the screwthread flights 16a of the adjusting screw 16 in the screwthread flights 1a of the tool head 1, the arrangement has a prestressing device which is generally identified by 17 and which urges the adjusting screw 16 into the screwthread flights 1a on the tool head 1. The prestressing device 17 has a spring 17a and a pushrod 17b.

After the relative position of the tool head 1 with respect to the shaft 3 has been set by way of the adjusting screw 16, that set position can be secured by way of a fixing device. In the present embodiment the fixing device comprises two substantially roller-shaped clamping eccentrics 18 which each extend in the adjustment direction on both sides of the adjusting screw 16. By rotating the clamping eccentrics 18, they are caused to bear snugly and firmly against the tool head 1 and thus provide for clamping the tool head 1 and the shaft 3.

Thus, the relative position of the shaft 3 with respect to the tool head 1 can be quickly and precisely fixed in a simple manner by way of adjustment of the adjusting screw 16 and subsequent rotation of the clamping eccentrics 18. This permits adaptation to the most widely varying types of machines.

It will be appreciated that the present invention is not limited to the illustrated embodiments. For example, the tool head 1 may also have a different number of knurling wheels 2. The adjustment and the arrangement of the knurling wheels 2 in the head may also vary. It will be appreciated that the knurling wheels 2 are preferably interchangeable and can be exchanged according to the respective desired knurling effect.

The invention claimed is:

1. A knurling tool comprising:
   a tool head which carries at least one knurling wheel and which is mounted adjustably on a shaft,
   wherein the tool head is mounted on the shaft linearly displaceably transversely with respect to an axis of the shaft,
   wherein a fixing device is provided for securing a relative position of the tool head with respect to the shaft, the fixing device being arranged between the tool head and the shaft, and
   wherein the fixing device comprises at least one clamping eccentric operative between the tool head and the shaft.

2. A knurling tool as set forth in claim 1,
   wherein an adjusting device is provided for setting the relative position of the tool head with respect to the shaft,
   wherein the at least one clamping eccentric comprises a first clamping eccentric and a second clamping eccentric,
   wherein the first clamping eccentric extends in an adjusting direction and is disposed on a first side of the adjusting device, and
   wherein the second clamping eccentric extends in the adjusting direction and is disposed on a second side of the adjusting device.

3. A knurling tool as set forth in claim 1, wherein a dovetail guide mechanism is provided for linear guidance of the tool head on the shaft.

4. A knurling tool as set forth in claim 1, wherein an adjusting device is provided for setting a relative position of the tool head with respect to the shaft.

5. A knurling tool as set forth in claim 4, wherein the adjusting device comprises an adjusting screw extending in an adjustment direction.

6. A knurling tool as set forth in claim 5,
   wherein the adjusting screw is mounted rotatably but axially immovably in the shaft or the tool head, and
   wherein screwthread flights of the adjusting screw engage with corresponding screwthread flights on the tool head or the shaft.

7. A knurling tool as set forth in claim 5, wherein a prestressing device is provided for pressing the adjusting screw into screwthread flights on the tool head or the shaft.

8. A knurling tool as set forth in claim 1,
   wherein the at least one knurling wheel comprises a first knurling wheel and a second knurling wheel, and
   wherein the first and second knurling wheels are mounted adjustably on the tool head.

9. A knurling tool as set forth in claim 8,
   wherein a first pivot pin is mounted rotatably and adjustably in the tool head and extends transversely with respect to the axis of the shaft,
   wherein the first knurling wheel is mounted freely rotatably on the first pivot pin about an axis extending inclinedly with respect to an axis of the first pivot pin,
   wherein a second pivot pin is mounted rotatably and adjustably in the tool head and extends transversely with respect to the axis of the shaft, and
   wherein the second knurling wheel is mounted freely rotatably on the second pivot pin about an axis extending inclinedly with respect to an axis of the second pivot pin.

10. A knurling tool as set forth in claim 9, wherein the axis of the first pivot pin and the axis of the second pivot pins are perpendicular to an adjusting direction between the tool head and the shaft.

* * * * *